(12) United States Patent
Smith et al.

(10) Patent No.: US 11,006,463 B2
(45) Date of Patent: May 11, 2021

(54) WIRELESS CONNECTION FOR ELECTRONIC DEVICE

(71) Applicant: Hewlett-Packard Development Company, L.P., Spring, TX (US)

(72) Inventors: Kenneth K Smith, Boise, ID (US); Dan Rothenbuhler, Boise, ID (US); Andrew J Pendley, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,359

(22) PCT Filed: Oct. 27, 2016

(86) PCT No.: PCT/US2016/059157
§ 371 (c)(1),
(2) Date: Mar. 21, 2019

(87) PCT Pub. No.: WO2018/080502
PCT Pub. Date: May 3, 2018

(65) Prior Publication Data
US 2020/0015286 A1 Jan. 9, 2020

(51) Int. Cl.
*H04W 74/08* (2009.01)
*H04W 88/08* (2009.01)
*H04W 48/20* (2009.01)

(52) U.S. Cl.
CPC ....... *H04W 74/0866* (2013.01); *H04W 48/20* (2013.01); *H04W 88/085* (2013.01)

(58) Field of Classification Search
CPC ............. H04W 74/0866; H04W 48/20; H04W 88/085
See application file for complete search history.

(56) References Cited

U.S. PATENT DOCUMENTS

| 6,023,459 | A | * | 2/2000 | Clark ................... H04W 16/18 370/329 |
| 7,580,444 | B2 | | 8/2009 | Brown et al. |
| 8,239,694 | B2 | | 8/2012 | Saha et al. |
| 8,463,223 | B2 | | 6/2013 | Dickey et al. |
| 9,054,901 | B2 | | 6/2015 | Hessel |
| 2004/0125776 | A1 | | 7/2004 | Haugli et al. |
| 2005/0245269 | A1 | | 11/2005 | Demirhan et al. |

(Continued)

FOREIGN PATENT DOCUMENTS

| CN | 103152064 B | 11/2016 |
| CN | 104244374 B | 3/2019 |
| JP | 2014116678 A | 6/2014 |

OTHER PUBLICATIONS

Tabakovic, Z., et al, Cognitive Radio Frequency Assignment with Interference Weighting and Categorization, http://jwon.eurasipjournals.springeropen.com—Feb. 9, 2016—30 pages.

*Primary Examiner* — Yemane Mesfin
*Assistant Examiner* — Henry Baron
(74) *Attorney, Agent, or Firm* — Mannava & Kang

(57) ABSTRACT

An electronic device includes dynamic frequency system components. The dynamic frequency system components are set to non-interfering operation frequencies for a selected wireless communication channel and a scan is performed to establish a wireless connection on the selected wireless communication channel.

15 Claims, 5 Drawing Sheets

(56) References Cited

U.S. PATENT DOCUMENTS

| | | | |
|---|---|---|---|
| 2007/0009067 A1 | 1/2007 | Michalak | |
| 2007/0097940 A1 | 5/2007 | Yuen | |
| 2008/0057956 A1 | 3/2008 | Black et al. | |
| 2008/0187141 A1 | 8/2008 | Wang | |
| 2008/0198811 A1* | 8/2008 | Deshpande | H04W 48/16 370/332 |
| 2009/0092119 A1* | 4/2009 | Rengert | H04W 72/02 370/345 |
| 2014/0293894 A1* | 10/2014 | Saban | H04W 88/085 370/329 |
| 2016/0014824 A1 | 1/2016 | Xiang et al. | |
| 2016/0044648 A1 | 2/2016 | Gao et al. | |

* cited by examiner

FIG. 6

WIRELESS CONNECTION FOR ELECTRONIC DEVICE

BACKGROUND

Wireless communication has revolutionized communication and computer connectivity. Millions of electronic devices with wireless communication capability are sold each year, and these devices are not limited to mobile devices. Electronic devices with wireless communication capability include everything from kitchen appliances to printers. In many instances, the wireless communication capability of these electronic devices enables the electronic devices to connect to a wireless network and the Internet. This allows other devices to communicate with the electronic devices over the wireless network and over the Internet.

BRIEF DESCRIPTION OF DRAWINGS

Embodiments are described in detail in the following description with reference to the following figures. The embodiments are illustrated by examples shown in the accompanying figures in which like reference numerals indicate similar elements.

FIG. 6 illustrates a table including non-interfering operation frequencies for a dynamic frequency system component that considers harmonics, according to an example.

DETAILED DESCRIPTION OF EMBODIMENTS

Figure 1:
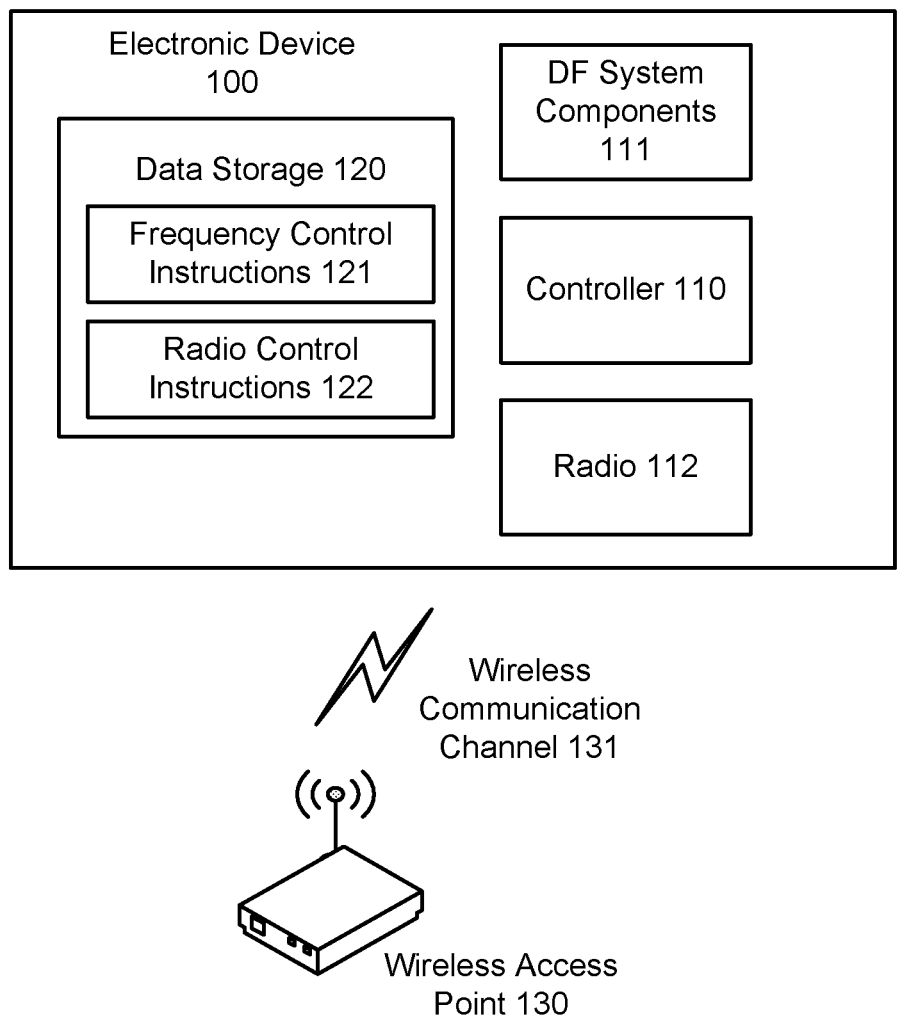
FIGS. 1-2 illustrate an electronic device, according to examples.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments.

According to an example of the present disclosure an electronic device determines a channel for wireless communication that minimizes interference. For example, an electronic device may connect to a wireless access point to connect to a wireless network over a wireless communication channel. A wireless communication channel includes one or more frequencies. For example, according to the IEEE 802.11 standards for wireless local area network (WLAN) communication, multiple communication channels, each including one or more frequencies, are available for wireless communication between a source and a destination in a WLAN. One of the channels may be selected for communication between a source and a destination. For example, for an electronic device to communicate with a wireless access point in a WLAN, the access point may select a channel, and the electronic device may learn the channel during a discovery phase, and subsequently establish communication with the access point on the channel.

Wireless interference may include a disruption of a wireless signal as it travels from a source to a destination. Interference can degrade performance of wireless communication. For example, interference can cause a signal to be dropped for periods of time, or reduced signal strength. For an application that may be bandwidth dependent or may be latency dependent, such as streaming video, voice over Internet protocol, etc., interference may cause the application to fail or degrade in quality. There are many factors that can cause interference. For example, other devices operating in the same frequency spectrum can cause interference. For example, microwaves and cordless phones are known to cause interference for the 2.4 Gigahertz (GHz) frequency spectrum. Also, physical barriers made of different materials, such as wood, concrete, etc., can cause interference.

Another factor that can cause interference is electrical components in an electronic device. For example, certain electrical components of an electronic device may generate electromagnetic noise that interferes with a radio of the electronic device that transmits and receives wireless signals for wireless communication. According to an example of the present disclosure, an electronic device can control operation frequencies of interference-causing electrical components of the electronic device to minimize interference on a wireless communication channel used by the electronic device.

FIG. 1 shows an example of an electronic device 100 with a controller 110 that can control operation frequencies of dynamic frequency (DF) system components 111 of the electronic device 100 to minimize interference on a wireless communication channel 131 used by the electronic device 100. For example, the electronic device 100 may connect to the wireless access point 130 via the wireless communication channel 131. The wireless access point 130 may be part of a WLAN. The electronic device 100 may connect to the wireless access point 130 to communicate with other devices in the WLAN or to connect to the Internet. The electronic device 110 may include any type of electronic device with a radio and system components that may interfere with the radio. The electronic device 100 may include printers, laptops, desktops, tablets, smartphones, smart televisions, kitchen appliances, or other types of electronic devices.

The electronic device 100 includes a controller 110, a radio 112 and a data storage 120 in addition to the DF system components 111. The controller 110 is hardware such as an integrated circuit, e.g., a microprocessor. In other examples, the controller 110 may include an application-specific integrated circuit, field programmable gate arrays or other type of integrated circuits designed to perform specific tasks. The controller 110 may include a single controller or multiple separate controllers. For example, the controller 110 may include a controller to control operations of the DF system components 111, including operation frequencies, and a controller to control operations of the radio 112. The data storage 120 may include memory and/or other types of volatile or nonvolatile data storage devices. The data storage 120 may include a non-transitory computer readable medium storing machine readable instructions that are executable by the controller 110. The machine readable instructions may include frequency control instructions 121 to control the operation frequencies of the DF system components 111, and radio control instructions 122 to control operation of the radio 112 as is further discussed below.

The DF system components 111 may include system components that operate according to a clock signal. The operation frequency of the DF system components 111 may be changed for example responsive to instructions from the controller 110. The operation frequency may be based on a clock rate of a clock signal. For example, the clock rate may control the speed of operation of the DF system component. For example, a DF system component may include a central processing unit (CPU) running at a particular speed measured in clock cycles per second. The operation frequency, e.g., the number of clock cycles per second, may be adjusted by the controller 110. Other examples of DF system components 111 may include memory, such as double data rate (DDR) dynamic random-access memory (DRAM), NAND flash memory, non-volatile RAM, etc., input/output (I/O) components, such as a universal serial bus (USB) or network controller, printer subsystems and interfaces, display subsystem with clock-controlled refresh rate, keyboard interface, and other electronic System-On-Chip (SOC) subsystems. The controller 110 and the data storage 120 may be part of the DF system components 111. For example, the controller 110 may include a processor with a modifiable operation frequency, and the data storage 120 may include memory with a modifiable operation frequency. Also, the DF system components 111 may include a communication interface for the controller 110, and/or a communication interface for the radio 112 which can be implemented at different frequencies. For example, the communication interface may include a Secure Digital Input Output (SDIO) bus interface. The frequency of the communication interface may be adjusted by the controller 110 to minimize wireless interference.

The radio 112 may include a wireless network interface that can communicate with the wireless access point 130 or other wireless devices using a predetermined standard, such as an 802.11 standard or another standard. The radio 112 may include analog and digital circuits. For example, radio frequency, mixed-signal and other analog circuits operate as a transceiver to transmit and receive wireless signals via the wireless communication medium (e.g., physical layer interface), and a digital circuit may include a digital signal processor (DSP) for communication processing and for executing instructions or commands from the controller 110.

The controller 110 may control the operation frequencies of the DF system components 111 to minimize interference on the wireless communication channel 131. In an example, prior to communicating with the wireless access point 130 on the wireless communication channel 131, the controller 110 may select the wireless communication channel 131 for communicating with the wireless access point 130. Multiple wireless communication channels may be available for communicating with the wireless access point 130, and the controller 110 selects one of the wireless communication channels (e.g., wireless communication channel 131) according to an example. In another example, the controller 110 may select a block of wireless communication channels as is further discussed below. The controller 110 sets at least one of the DF system components 111 to a non-interfering operation frequency for the wireless communication channel 131. For example, predetermined non-interfering operation frequencies may be determined for a set of the DF system components 111 that do not interfere with the wireless communication channel 131. The controller 110 sets the set of DF system components 111 to their respective non-interfering operation frequencies. The predetermined non-interfering operation frequency for each of the DF system components 111 may vary depending on the selected wireless communication channel for communicating from the radio 112. In an example, the controller 110 may execute the frequency control instructions 121 to set the operation frequency of the DF system components 111.

After setting the operation frequency of the DF system components 111 to non-interfering operation frequencies, the controller 110 may instruct the radio 112 to scan for the selected wireless communication channel 131 while the DF system components 111 are at their non-interfering operation frequencies, and connect to the wireless access point 130 via the wireless communication channel 131 based on the scanning. Scanning may include listening on the wireless communication channel 131 for a message from the wireless access point 130 to establish communication with the wireless access point 130 on the wireless communication channel 131. In an example, the message may include a beacon frame. A beacon frame is a management frame in the 802.11 standard, and the beacon frame contains information about the network. Beacon frames are transmitted periodically from the wireless access point 130 to announce the presence of the WLAN. If the radio 112 receives the beacon frame during the scan for the wireless communication channel 131, the radio 112 may connect to the wireless access point 130 on the wireless communication channel 131 if accepted by the wireless access point 130. Then, the electronic device 100 may communicate with the wireless access point 130 on the wireless communication channel 131 with minimal interference from the DF system components 111. In an example, the controller 110 may execute the radio control instructions 122 to instruct the radio 112 to scan for a selected wireless communication channel. Also, the wireless access point 130 is a wireless device. A wireless device is any device that can communicate wirelessly with the electronic device 100 via the wireless communication channel 131. In an example, the electronic device 100 may connect with a wireless device other than a wireless access point via wireless communication channel 131 while minimizing interference from the DF system components 111. For example, the electronic device 100 may connect with a printer, a personal computer, a mobile device or another type of wireless device via wireless communication channel 131 while minimizing interference from the DF system components 111.

Figure 2:
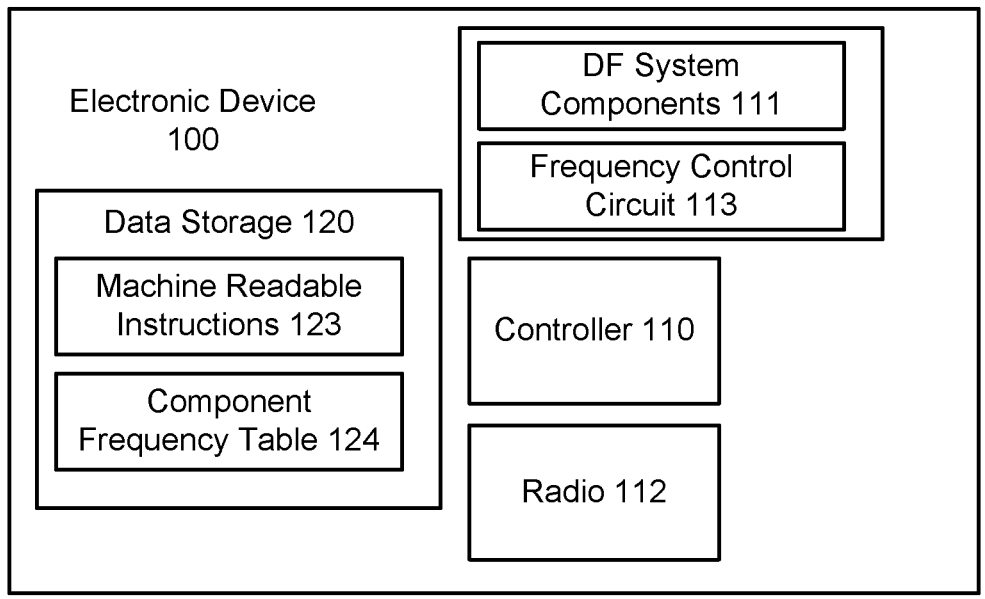
Figure 2:
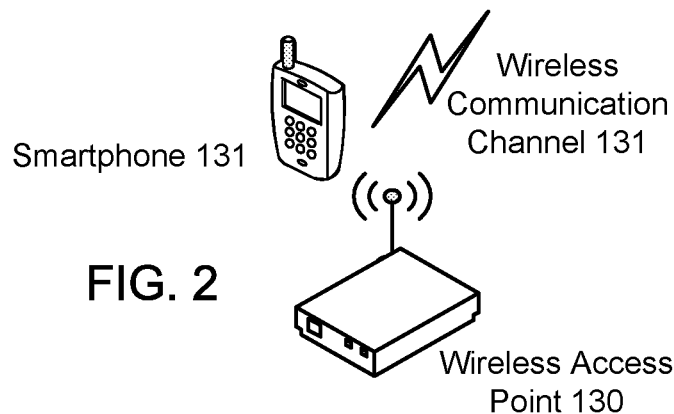

FIG. 2 shows a block diagram of the electronic device 100, according to another example. In this example, the data storage 122 stores a component frequency table 124 and machine readable instructions 123. The machine readable instructions 123 for example include the frequency control instructions 121 and the radio control instructions 122. The component frequency table 124 includes non-interfering operation frequencies for the DF system components 111 for a plurality of wireless communication channels that may be used by the radio 112 to communicate with the wireless access point 130 or other wireless devices. An example of non-interfering operation frequencies for the DF system components 111 for a plurality of wireless communication channels that may be in the component frequency table 124 is described below.

Table 1 below shows the wireless communication channels of the 802.11 standard. Table 1 shows the channel number, and the center channel and the minimum and maximum frequency in each channel.

TABLE 1

| Channel | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Center | 2412 | 2417 | 2422 | 2427 | 2432 | 2437 | 2442 | 2447 | 2452 | 2457 | 2462 | 2467 | 2472 | 2484 |
| Min | 2401 | 2406 | 2411 | 2416 | 2421 | 2426 | 2431 | 2436 | 2441 | 2446 | 2451 | 2456 | 2461 | 2473 |
| Max | 2423 | 2428 | 2433 | 2438 | 2443 | 2448 | 2453 | 2458 | 2463 | 2468 | 2473 | 2478 | 2483 | 2495 |
| 36 | 40 | 44 | 48 | 52 | 56 | 60 | 64 | | | | | | | |
| 5180 | 5200 | 5220 | 5240 | 5260 | 5280 | 5300 | 5320 | | | | | | | |
| 5170 | 5190 | 5210 | 5230 | 5250 | 5270 | 5290 | 5310 | | | | | | | |
| 5190 | 5210 | 5230 | 5250 | 5270 | 5290 | 5310 | 5330 | | | | | | | |
| 100 | 104 | 108 | 112 | 116 | 120 | 124 | 128 | 132 | 136 | 140 | 144 | | | |
| 5500 | 5520 | 5540 | 5560 | 5580 | 5600 | 5620 | 5640 | 5660 | 5680 | 5700 | 5720 | | | |
| 5490 | 5510 | 5530 | 5550 | 5570 | 5590 | 5610 | 5630 | 5650 | 5670 | 5690 | 5710 | | | |
| 5510 | 5530 | 5550 | 5570 | 5590 | 5610 | 5630 | 5650 | 5670 | 5690 | 5710 | 5730 | | | |
| 149 | 153 | 157 | 161 | 165 | | | | | | | | | | |
| 5745 | 5765 | 5785 | 5805 | 5825 | | | | | | | | | | |
| 5735 | 5755 | 5775 | 5795 | 5815 | | | | | | | | | | |
| 5755 | 5775 | 5795 | 5815 | 5835 | | | | | | | | | | |

Figure 6:
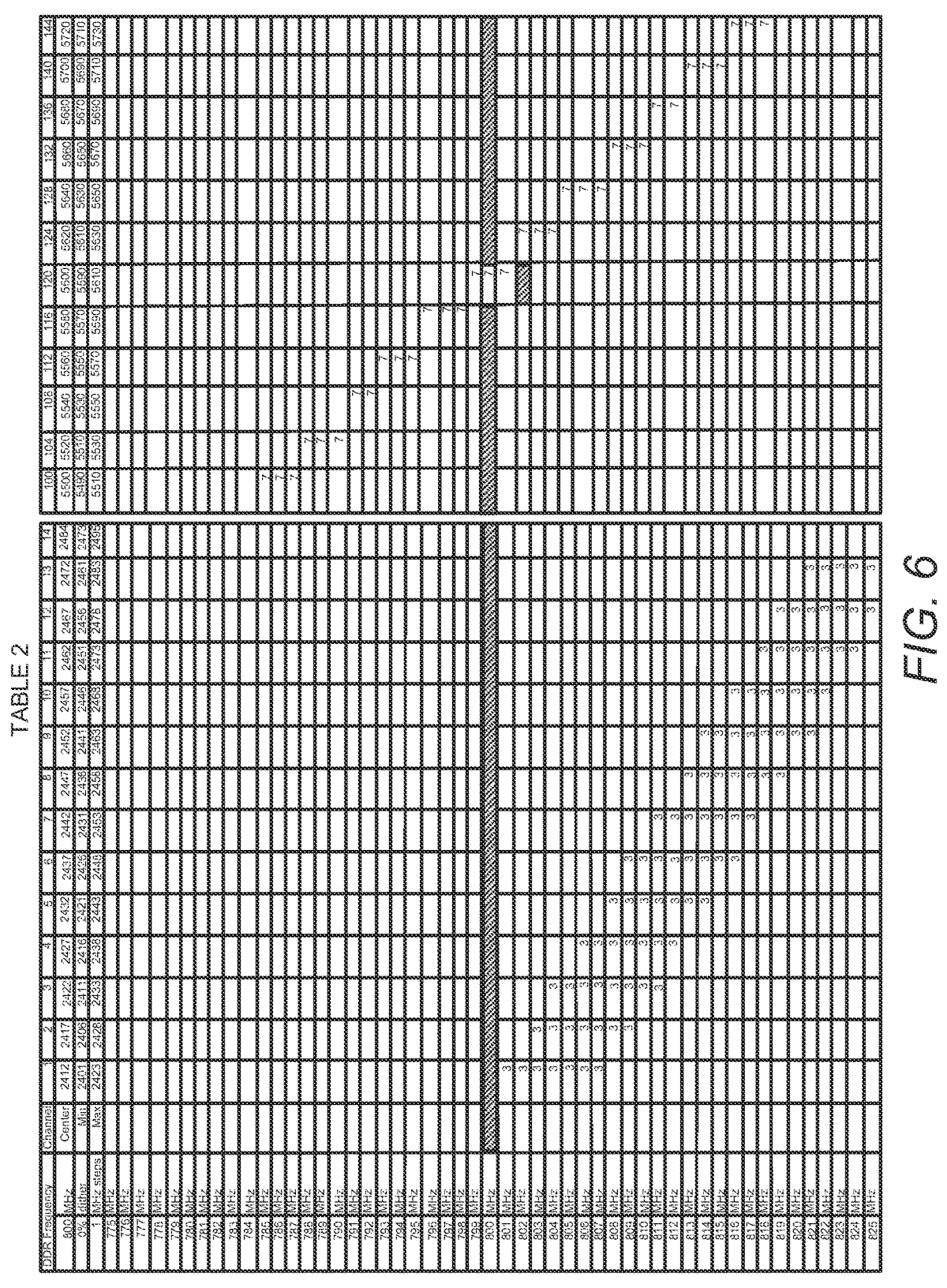

A DF system component of the electronic device 100 operating at a frequency in the frequency range of a particular channel may interfere with the channel. Also, a harmonic of the operation frequency of a DF system component may also interfere with the channel. Accordingly, a non-interfering operation frequency for a DF system component may be determined for a channel that accounts for an operation frequency and harmonics of an operation frequency that may interfere with the channel. Table 2 as shown in FIG. 6 and described below includes an example of a non-interfering operation frequency for a DF system component that considers harmonics.

Table 2 shows an example of operation frequencies that may be set for a DDR synchronous DRAM (SDRAM). For example, the operation frequency may be set to a frequency in a range between 775 MHz and 825 MHz. These values may be determined by a manufacturer or other entity. The DDR SDRAM for example is a DF system component. An operation frequency that may be a default for the DDR SDRAM is 800 MHz, which causes a 7th order harmonic interference at 5600 MHz, which interferes with channel 120 as shown in table 2. Table 2 also shows that the 3rd order harmonic causes interference for channels 2-14 for operation frequencies from 801 MHz to 825 MHz. If channel 120 is selected, and the DDR SDRAM is operating at 800 MHz, the 7th order harmonic may interfere with channel 120. The controller 110 may change the operation frequency of the DDR SDRAM to 802 MHz to minimize interference with channel 120. Also, the component frequency table 124 may store an operation frequency of 802 MHz for the DDR SDRAM for channel 120. Accordingly, once channel 120 is selected prior to the scan, the controller 110 may perform a lookup in the component frequency table 124 to determine the operation frequency for the DDR SDRAM for the selected channel. In this example, the lookup may return a value of 802 MHz for the DDR SDRAM. The controller 110 may set the operation frequency of the DDR SDRAM to 802 MHz and then the scan is conducted to establish a connection on channel 120.

The component frequency table 124 may store non-interfering operation frequencies for the DF system components 111 for each channel. The lookup in the component frequency table 124 may return non-interfering operation frequencies for the DF system components 111 for the selected channel. In some situations, the operation frequency of a DF system component may not interfere with a selected channel. In those situations, the component frequency table 124 may store a default operation frequency for the DF system component for the selected channel. The default may include a manufacturer-recommended operation frequency or may include an operation frequency selected for maximum performance or for maximum power savings or may be determined based on a combination of factors. Some examples of the DF system components may include a display, an optical scanner, a USB port, a motor control interface, a system on chip (SOC), DDR SDRAM, microprocessor, a network interface, etc. The component frequency table 124 may include non-interfering operation frequencies for these DF system components for each channel.

In an example, the non-interfering operation frequencies for the DF system components 111 may be determined through testing and/or calculations. For example, harmonics may be calculated for operation frequencies. However, measurements, such as signal strength or other interference measurements, may be performed during testing to determine whether an operation frequency or a harmonic actually interferes with a particular channel. For example, a harmonic of a DF system component at a particular operation frequency may include a frequency in the frequency range of a channel, but the DF system component may be located in the electronic device 100 at a position spaced apart from the radio 112, and thus interference is minimal from the DF system component. The testing may identify these situations and non-interfering operation frequencies may be selected based on the testing.

Figure 4:
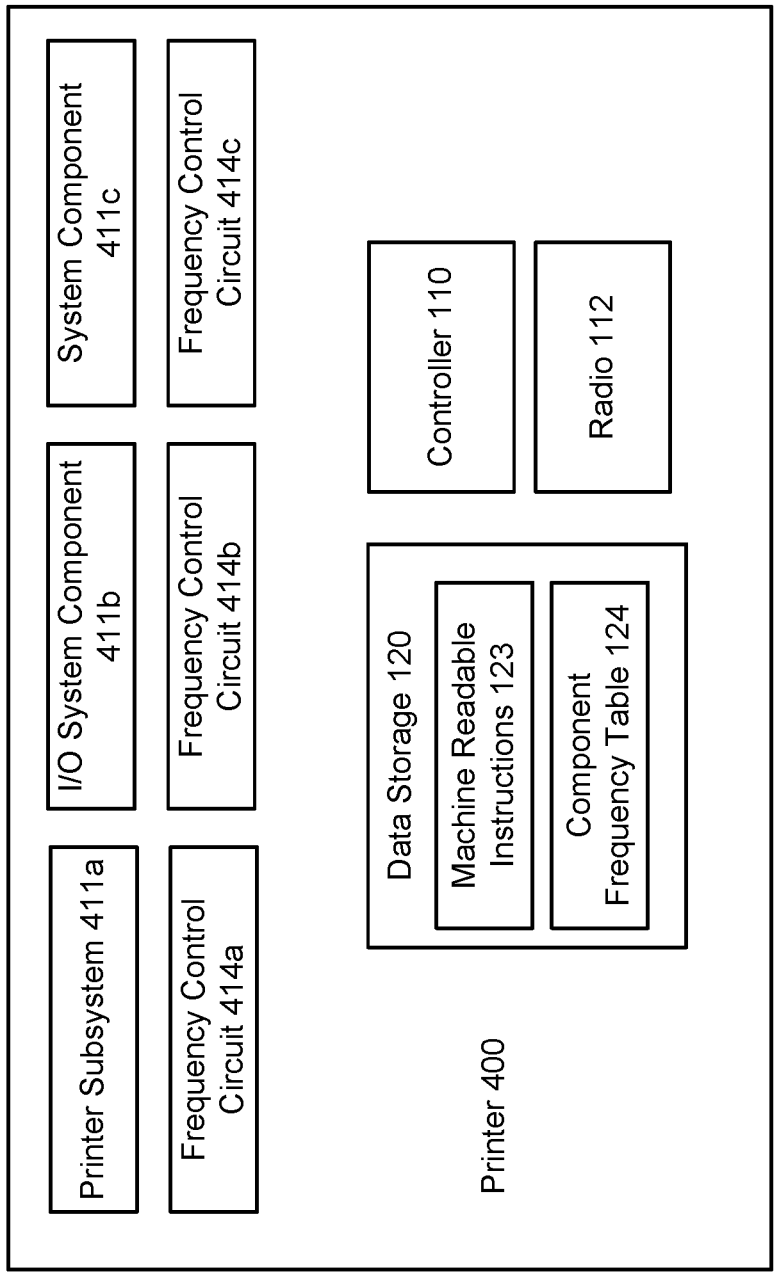
FIG. 4 illustrates an electronic device, according to another example.
Figure 4:
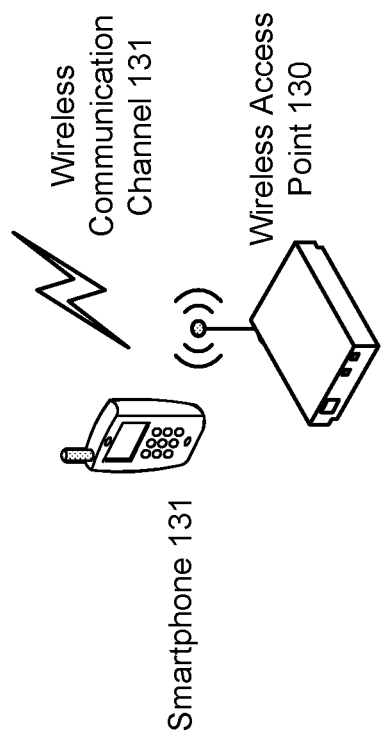

Referring to FIG. 2, frequency control circuit 113 may control the operation frequency of a DF system component or multiple DF system components. The electronic device 100 may include multiple frequency control circuits. In an example, the frequency control circuit 113 may include a phase locked loop (PLL). The output of the PLL may be connected to one or multiple DF system components. In an example, two or more PLLs may be included in the electronic device 100. For example, a first PLL is used to produce fixed operation frequencies for certain DF system components, such as I/O components (e.g., USB, network interface and other system elements that may use an exact reference frequency). The first PLL may include one or multiple PLLs. A second PLL may be used to create operation frequencies for other DF system components. The PLLs may be able to change the operation frequencies of the DF system components 111 in 1 MHz increments or in increments having other sizes. By having two or more PLL's, the controller 110 is able to precisely tune different DF system components to the desired operation frequency to minimize interference for the selected channel. As discussed above, the electronic device 100 may connect with a wireless device other than the wireless access point 130 via wireless communication channel 131 while minimizing interference caused by the DF system components 111. FIGS. 2 and 4 show an example whereby a smartphone 131 may connect to the electronic device 100 via wireless communication channel 131 while minimizing interference caused by the DF system components 111.

Figure 3:
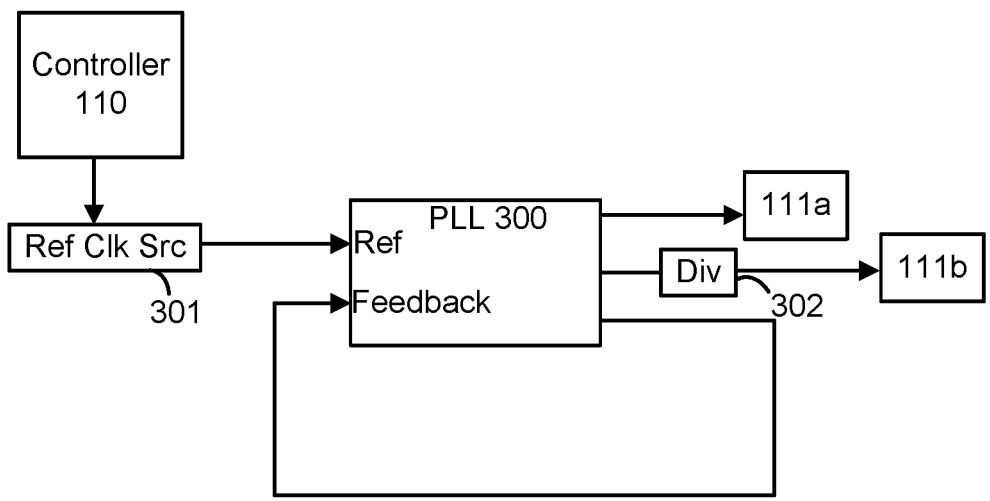
FIG. 3 illustrates a frequency control circuit, according to an example.

FIG. 3 shows PLL 300. In an example, the PLL 300 may be used for the frequency control circuit 113. The PLL 300 outputs a clock signal that may be used to drive a DF system component. For example, the PLL 300 determines a phase difference between a reference clock signal coming from reference clock source 301 and a feedback signal that is an output signal from the PLL 300. The PLL 300 may internally include a voltage controlled oscillator (VCO) that is driven by an error signal which is proportional to the phase difference. For example, if the phase of the output signal drifts, the error signal increases. The error signal, drives the VCO phase in the opposite direction so as to reduce the error. Thus, the PLL 300 locks the phase of the output signal from the PLL 300 to the reference clock signal from the reference clock source 301.

The output of the PLL 300 may be used as the clock signal for one or multiple DF system components. FIG. 3 shows an example whereby the output of the PLL 300 drives DF system component 111a and 111b. A divider 302 may divide the output signal of the PLL 300 to drive DF system component 111b at an operation frequency different from DF system component 111a. For example, the PLL 300 may output a clock signal at 800 MHz to drive DF system component 111a, and divider 302 may divide the output signal to drive DF system component 111b at 400 MHz.

In an example, the controller 110 may control the reference clock source 301 to change the frequency of operation. For example, the controller 110 performs a lookup in the component frequency table 124 to determine the operation frequency for the DF system components 111a and 111b for a selected channel. For example, the DF system component 111a may be DDR SDRAM, and based on the lookup, the controller 110 determines the operation frequency is to change from 800 MHz to 802 MHz. The controller 110 sends a command to the reference clock source 301 to change its frequency to 802 MHz. The PLL 300 drives DF system component 111a at 802 MHz and drives DF system component 111b at 401 MHz.

FIG. 4 shows another example of the electronic device which may embody the electronic device 100 shown in FIG. 1 and/or FIG. 2. In FIG. 4, the electronic device is a printer 400. The printer 400 includes printer subsystem 411a, which may be a DF system component. For example, the printer subsystem 411a may include at least one of an optical scanner, a motor interface, a laser printer microcontroller, a printhead microcontroller, or other components for printing and/or scanning. The frequency of operation of these components may be controlled by frequency control circuit 414a. The frequency control circuit 414a may include one or more PLLs such as discussed above with respect to FIGS. 2 and 3. The printer 400 may include I/O system component 411b and system component 411c. The operation frequency of I/O system component 411b may be controlled by the frequency control circuit 414b, and the operation frequency of system component 411c may be controlled by the frequency control circuit 414c. The frequency control circuit 414b-c may each include one or multiple PLLs such as discussed above with respect to FIGS. 2 and 3. The I/O system component 411c may include a USB port, a network interface or other I/O components. The system component 411c may include a display interface, a keyboard interface, a processor, memory or other type of system component. The system components 411a-c may be DF system components that have an operation frequency determined by the controller 110. Also, the DF system components may include may include a communication interface, such as an SDIO bus interface, for the controller 110, and/or the radio 112 which can be adjusted to operate at different operation frequencies to minimize wireless interference.

Figure 5:
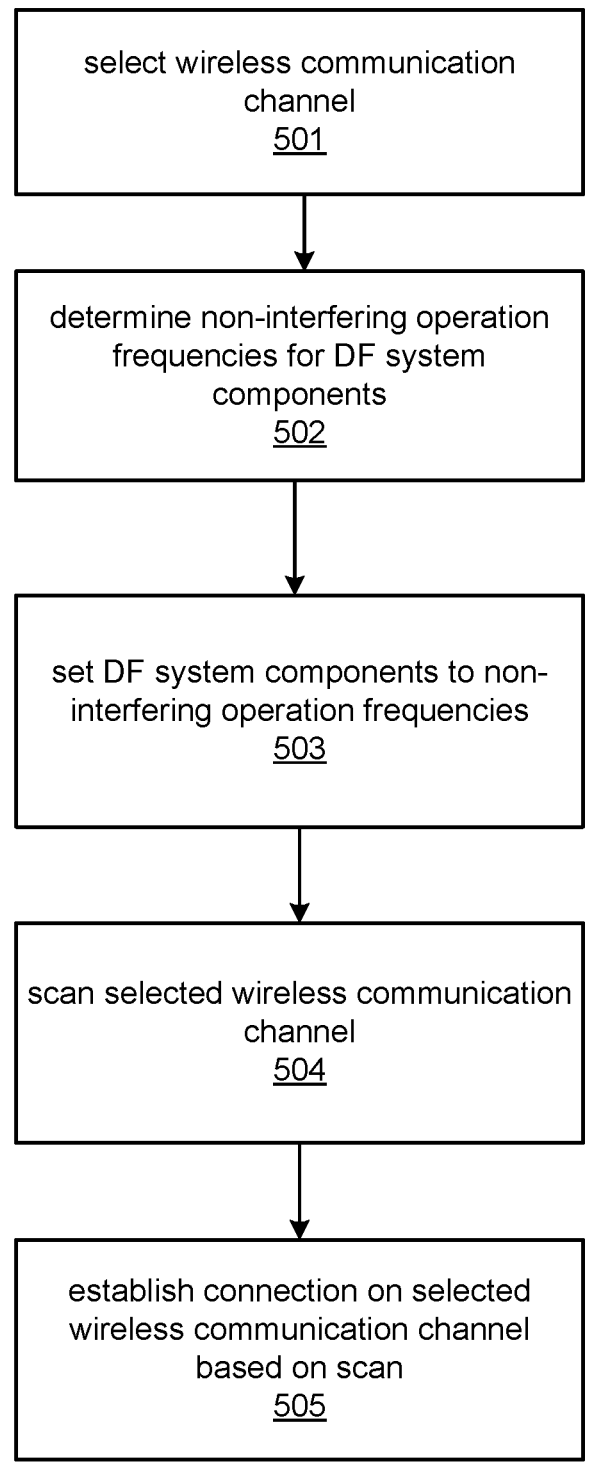
FIG. 5 illustrates a method, according to an example.

FIG. 5 illustrates a method 500 according to an example. The method 500 may be performed by the electronic device shown in FIGS. 1, 2 and/or 4. The method 500 may be performed by a processor executing machine readable instructions, such as the frequency control instructions 121 and the radio control instructions 122 executed by the controller 110.

At 501, a wireless communication channel is selected. Examples of wireless communication channels are shown in table 1. A wireless communication channel may be selected for communicating with the wireless access point 130 or other wireless devices. A wireless communication channel may be selected from a plurality of wireless communication channels randomly or based on predetermined factors. In an example, a previously-used wireless communication channel may be selected. A single wireless communication channel or multiple wireless communication channels may be selected. For example, if multiple wireless communication channels are selected, the channels may include a block of sequential channels, such as channels 1-3 or channels 1-5 in table 1.

At 502, non-interfering operation frequencies are determined for the DF system components 111 for the selected wireless communication channel. In an example, the controller 110 may perform a lookup in the component frequency table 124 to determine the non-interfering operation frequencies. A non-interfering operation frequency may include an operation frequency of a DF system component that does not interfere or minimizes interference with the selected wireless communication channel. For example, the non-interfering operation frequency may include an operation frequency of the DF system component that is not in the selected wireless communication channel and does not have a harmonic in the selected wireless communication channel. Table 2 shows an example of a 7th order harmonic of an 800 MHz operation frequency that may interfere with channel 120. If multiple wireless communication channels are selected at 501, then non-interfering operation frequencies are determined for the DF system components 111 for the multiple wireless communication channels.

At 503, the DF system components 111 are set to the non-interfering operation frequencies determined at 502. For example, the lookup may return a non-interfering operation frequency for each DF system component, and the controller 110 sets the non-interfering operation frequency for each DF system component. The frequency control circuit 113 may be used to set the non-interfering operation frequency for a DF system component. An example of the frequency control circuit 113 is shown in FIG. 3, which may include PLL 300.

At 504, a scan of the selected wireless communication channel is performed. The scan may be performed after setting the non-interfering operation frequencies so the operation frequencies of the DF system components 111 do not interfere with the scan. The radio 112 may perform the scan. For example, the controller 110 may instruct the radio 112 to perform the scan for the selected wireless communication channel. The scan may include listening for a message, such as a beacon frame, on the selected wireless communication channel in order to establish communication with another device, such as the wireless access point 130.

At 505, a wireless connection is established based on the scan. For example, the radio 112 connects to the wireless access point 130 on the selected wireless communication channel based on the scan. Establishing a wireless connection may include exchanging messages to confirm the radio 112 and the wireless access point 130 agree to communicate on the wireless communication channel.

In an example, the wireless access point 130 broadcasts a beacon frame to announce its presence and provide network information, such as Service set identifier (SSID) and other parameters. During the scan, the radio 112 listens for the beacon frame on the selected wireless communication channel (e.g., wireless communication channel 131) for a predetermined period of time. If the radio 112 receives the beacon frame in the predetermined of period of time during the scan, the radio 112 sends an association request message to the wireless access point 130, which may include the SSID of the network and other information about the radio 112. The wireless access point 130 receives the association request message and may decide to associate with the radio 112. The wireless access point 130 sends an association response message to the radio 112 containing an acceptance or rejection notice to the radio 112. If the connection is accepted, the connection is established between the wireless access point 130 and the radio 112, and the radio 112 may communicate with the wireless access point 130 and other wireless devices on the WLAN via wireless communication channel 131, and interference from the DF system components 111 is minimized because the DF system components 111 were set to non-interfering operation frequencies for the wireless communication channel 131 prior to the scan.

A connection may not be established between the wireless access point 130 and the radio 112 if the beacon frame is not received in the predetermined of period of time during the scan or if the wireless access point 130 does not accept the association request. If a connection is not established between the wireless access point 130 and the radio 112 on the selected wireless communication channel, the method 500 may be repeated for another selected wireless communication channel. For example, during a first iteration, channel 1 in table 1 may be selected. If a connection is not established during the scan, then the method 500 may be repeated for another selected channel, such as channel 2 or channel 120. The method 500 may be repeated until a connection is established between the wireless access point 130 and the radio 112 on a selected channel or until a predetermined number of iterations of the method 500 is reached. If after a predetermined number of iterations of the method 500 a connection is not established, an error message may be generated to notify a user of the electronic device 100 that other actions may need to be taken, such as a reboot other trouble-shooting operations.

As discussed above, a block of wireless communication channels may be selected at 501. A block of wireless communication channels may be consecutive wireless communication channels. For example, assume wireless communication channels 1-3 are selected at 501 as a block of communication channels. If at 505, a connection cannot be established on channel 1 (e.g., after expiration of a predetermined period of time or in response to a rejection notice from the wireless access point 130), then the radio 112 may try to establish a connection with the wireless access point 130 on channel 2 without having to set the non-interfering operation frequencies for the DF system components 111 again. If a connection cannot be established on channel 2 then channel 3 is tried without having to set the non-interfering operation frequencies for the DF system components 111 again. This is because the non-interfering operation frequencies were previously set at 503 for the entire block of channels 1-3. Accordingly, the radio 112 may consecutively try to establish a connection on one of channels 1-3 without having to repeatedly set the non-interfering operation frequencies. If a connection cannot be established on any of channels 1-3, then the method 500 may be repeated for a second block of channels, such as channels 120-128. This process may be repeated until a connection is established between the wireless access point 130 and the radio 112 on one of the channels in the block of channels or until a predetermined number of attempts are performed.

The electronic device 100 may establish a connection with another wireless device without a wireless access point or a WLAN. For example, the electronic device 100 may establish a connection with another wireless device wireless device directly through a peer-to-peer wireless connection. In an example, the electronic device 100 selects the wireless communication channel at 501 by receiving a message from the wireless device, such as smartphone 131 shown in FIGS. 2 and 4, requesting connection on a particular wireless communication channel. At 502 and 503, the non-interfering operation frequencies are determined and are set for the selected wireless communication channel. At 504 and 505, the scanning and establishing a connection may include exchanging messages between the electronic device 100 and the wireless device to establish a connection on the selected wireless communication channel. The message exchange to determine the selected channel and to perform the scan and to establish a connection may be performed according to the Wi-Fi Direct™ protocol or another wireless protocol for establishing a wireless connection.

While the embodiments have been described with reference to examples, those skilled in the art will be able to make various modifications to the described embodiments without departing from the scope of the claimed embodiments.

What is claimed is:

1. An electronic device comprising:
a radio to communicate with a wireless access point;
a controller comprising a hardware processor; and
a dynamic frequency system component receiving a clock signal, wherein the controller controls a rate of the clock signal to cause the dynamic frequency system component to operate at an operation frequency, wherein the dynamic frequency system component is an internal component of the electronic device and the wireless access point is external to the electronic device,
wherein the controller is to:
select a wireless communication channel for the radio to communicate with the wireless access point, wherein the selected wireless communication channel includes a particular range of frequencies;

determine a non-interfering operation frequency for the dynamic frequency system component that does not interfere with the particular range of frequencies of the selected wireless communication channel;

control the rate of the clock signal of the dynamic frequency system component to cause the dynamic frequency system component to operate at the non-interfering operation frequency that does not interfere with the particular range of frequencies of the selected wireless communication channel;

subsequent to causing the dynamic frequency system component to operate at the non-interfering operation frequency, instruct the radio to scan the selected wireless communication channel to connect with the wireless access point; and establish a connection between the radio and the wireless access point over the selected wireless communication channel based on the scan of the selected wireless communication channel.

2. The electronic device of claim 1, wherein, to establish the connection between the radio and the wireless access point, the controller is to:

determine whether a message is received from the wireless access point via the selected wireless communication channel during the scan;

in response to receiving the message, connect to the wireless access point via the selected wireless communication channel; and in response to not receiving the message,
select a second wireless communication channel to scan;
set the operation frequency of the dynamic frequency system component to a second non-interfering operation frequency that does not interfere with a range of frequencies of the second wireless communication channel;
cause the radio to scan the second wireless communication channel subsequent to setting the operation frequency of the dynamic frequency system component to the second non-interfering operation frequency; and
connect the radio to the wireless access point via the second wireless communication channel based on the scan of the second wireless communication channel.

3. The electronic device of claim 2, wherein the message comprises at least one of a first message periodically broadcasted over the selected wireless communication channel from the wireless access point announcing a wireless network, and a second message transmitted from the wireless access point to the radio accepting an association with the radio over the selected wireless communication channel.

4. The electronic device of claim 1, wherein to select the wireless communication channel, the controller is to select a plurality of wireless communication channels to scan;

to determine the non-interfering operation frequency, the controller is to determine the non-interfering operation frequency that does not interfere with ranges of frequencies of the plurality of wireless communication channels; and to cause the dynamic frequency system component to operate at the non-interfering operation frequency, the controller is to set the operation frequency of the dynamic frequency system component to the non-interfering operation frequency that does not interfere with the ranges of frequencies of the plurality of wireless communication channels.

5. The electronic device of claim 4, wherein the radio is to scan each of the plurality of wireless communication channels until a connection with the wireless access point is established over one of the plurality of wireless communication channels, while the dynamic frequency system component is operating at the non-interfering operation frequency that does not interfere with the ranges of frequencies of the plurality of wireless communication channels.

6. The electronic device of claim 5, wherein the plurality of wireless communication channels comprises a plurality of consecutive wireless communication channels, and to scan each of the plurality of wireless communication channels, the radio is to consecutively scan each of the wireless communication channels until a connection with the wireless access point is established over one of the plurality of wireless communication channels.

7. The electronic device of claim 5, wherein in response to unsuccessfully establishing a connection with the wireless access point over any of the plurality of wireless communication channels, the controller is to:

select a second plurality of wireless communication channels to scan;

determine a second non-interfering operation frequency that does not interfere with ranges of frequencies of the second plurality of wireless communication channels;

set the operation frequency of the dynamic frequency system component to the second non-interfering operation frequency that does not interfere with the ranges of frequencies of the second plurality of wireless communication channels; and instruct the radio is to scan each of the second plurality of wireless communication channels until a connection with the wireless access point is established over one of the second plurality of wireless communication channels.

8. The electronic device of claim 1, comprising:
a frequency control circuit connected to the dynamic frequency system component, wherein the frequency control circuit is to adjust or control the operation frequency of the dynamic frequency system component.

9. The electronic device of claim 8, wherein the frequency control circuit comprises a phase locked loop having an input connected to a reference clock source and an output to generate the clock signal from the reference clock source, and wherein the controller is connected to the reference clock source to adjust a frequency of the clock signal generated from the reference clock source to adjust the operation frequency of the dynamic frequency system component.

10. The electronic device of claim 1, wherein the electronic device comprises a printer and the dynamic frequency system component comprises a printer subsystem component to print or to optically scan.

11. The electronic device of claim 1, wherein the dynamic frequency system component comprises an electronic component having an adjustable frequency of operation.

12. A non-transitory computer readable medium comprising machine readable instructions executable by a hardware processor in an electronic device to:

select a wireless communication channel for a radio of the electronic device to communicate with a wireless external device, wherein the selected wireless communication channel that includes a particular range of frequencies to be used by the radio to scan and communicate with the wireless external device;

determine a non-interfering operation frequency for an internal component of the electronic device that does not interfere with the particular range of frequencies of the selected wireless communication channel, wherein the internal component operates receives a clock signal to operate at an operation frequency, wherein a rate of the clock signal is controlled by the hardware processor;

control the rate of the clock signal of the internal component to cause the internal component to operate at the non-interfering operation frequency that does not interfere with the particular range of frequencies of the selected wireless communication channel;

subsequent to causing the internal component to operate at the non-interfering operation frequency, instruct the radio in the electronic device to scan the selected wireless communication channel to connect with the wireless external device; and establish a connection between the radio and the wireless external device over the selected wireless communication channel based on the scan of the selected wireless communication channel.

13. The non-transitory computer readable medium of claim 12, wherein the machine readable instructions are executable by the hardware processor to:

determine whether a connection is established between the radio and the wireless external device over the selected wireless communication channel;

in response to a determination that a connection is not established between the radio and the wireless external device over the selected wireless communication channel, select a second wireless communication channel to scan;

determine a second non-interfering operation frequency that does not interfere with a range of frequencies of the second wireless communication channel;

control the rate of the clock signal of the internal component to cause the internal component to operate at the second non-interfering operation frequency that does not interfere with the range of frequencies of the second wireless communication channel; and instruct the radio to scan the second wireless communication channel while the internal component is operating at the second non-interfering operation frequency that does not interfere with the range of frequencies of the second wireless communication channel to establish a connection between the radio and the wireless external device over the second wireless communication channel.

14. The non-transitory computer readable medium of claim 12, wherein the selected wireless communication channel comprises a plurality of wireless communication channels to scan, and to scan the selected wireless communication channel, the radio is to scan each of the plurality of wireless communication channels until a connection with the wireless external device is established over one of the plurality of wireless communication channels or until the radio unsuccessfully establishes a connection with the wireless external device over each of the plurality of wireless communication channels.

15. A method executable by a processor of an electronic device, the method comprising:

selecting a wireless communication channel for a radio of the electronic device to communicate with a wireless external device, wherein the selected wireless communication channel includes a particular range of frequencies to be used by the radio to scan and communicate with the wireless external device;

determining a non-interfering operation frequency for an internal component of the electronic device that does not interfere with the particular range of frequencies of the selected wireless communication channel, wherein the internal component receives a clock signal to operate at an operation frequency, and wherein the processor controls a rate of the clock signal of the internal component to control the operation frequency of the internal component;

controlling the rate of the clock signal of the internal component of the electronic device to cause the internal component to operate at the non-interfering operation frequency that does not interfere with the particular range of frequencies of the selected wireless communication channel;

subsequent to causing the internal component to operate at the non-interfering operation frequency, instructing the radio to scan the selected wireless communication channel to connect with the wireless external device; and establishing a wireless connection between the radio and the wireless external device over the selected wireless communication channel based on the scan of the selected wireless communication channel.

* * * * *